June 9, 1959 R. A. CHAPELLIER 2,890,009
VESSEL SUPPORT
Filed July 13, 1955 3 Sheets-Sheet 1
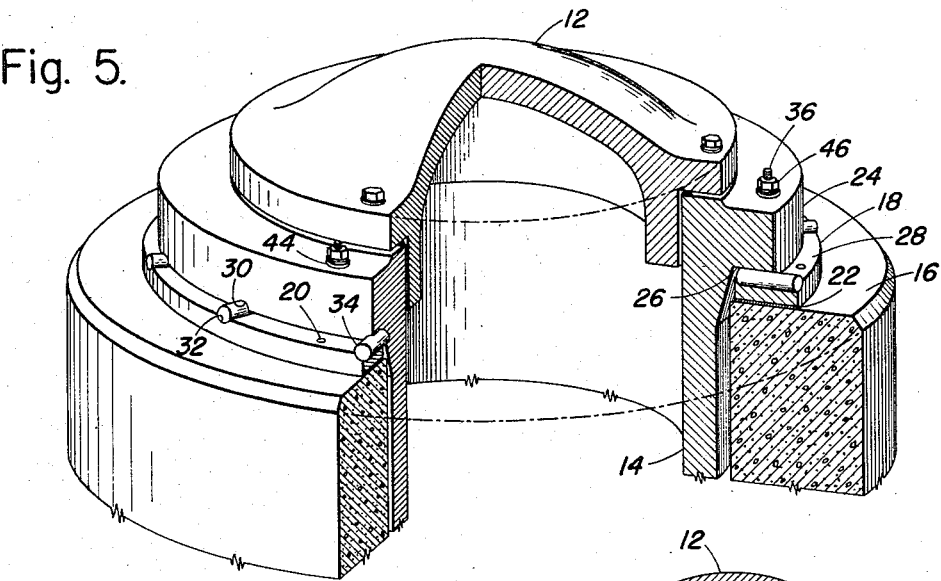
Fig. 5.
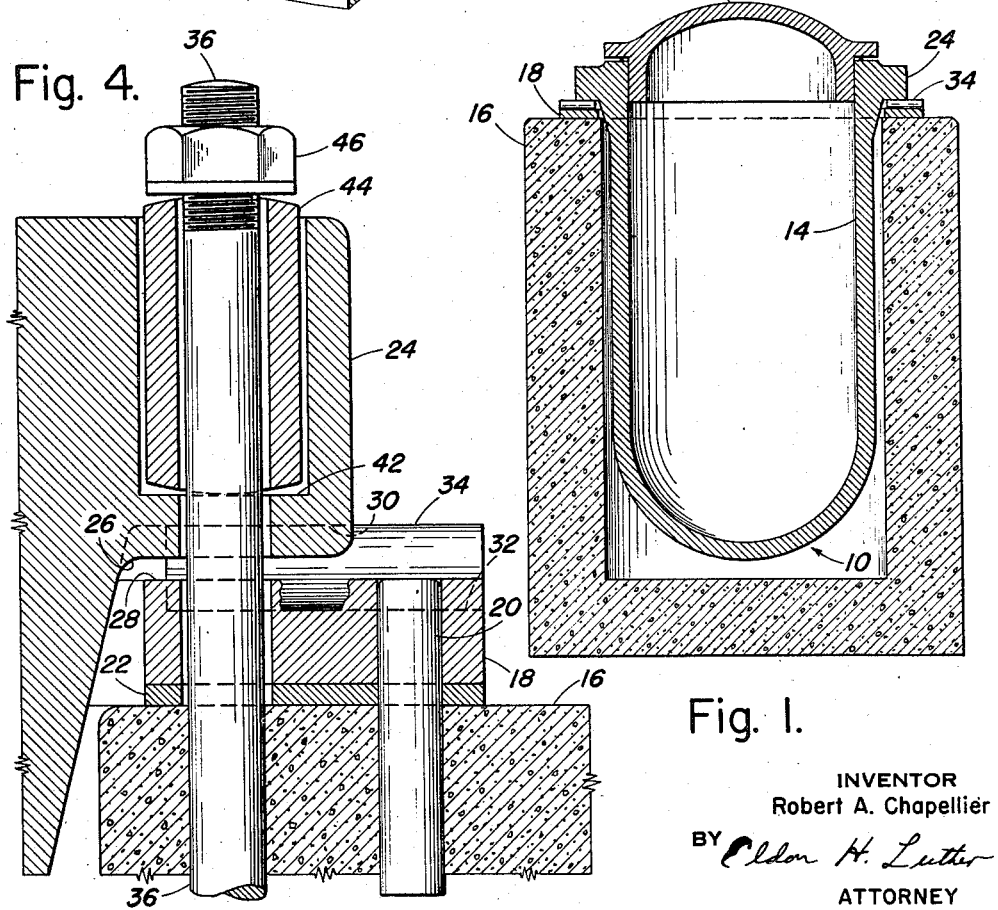
Fig. 4.
Fig. 1.
INVENTOR
Robert A. Chapellier
BY Eldon H. Luther
ATTORNEY June 9, 1959 R. A. CHAPELLIER 2,890,009
VESSEL SUPPORT
Filed July 13, 1955 3 Sheets-Sheet 2

INVENTOR
Robert A. Chapellier
BY Eldon H. Luther
ATTORNEY

June 9, 1959 R. A. CHAPELLIER 2,890,009
VESSEL SUPPORT
Filed July 13, 1955 3 Sheets-Sheet 3

INVENTOR
Robert A. Chapellier
BY Eldon H. Luther
ATTORNEY

United States Patent Office 2,890,009
Patented June 9, 1959

2,890,009

VESSEL SUPPORT

Robert A. Chapellier, Whitestone, N.Y., assignor to Combustion Engineering, Inc., New York, N.Y., a corporation of Delaware Application July 13, 1955, Serial No. 521,686

9 Claims. (Cl. 248—146)

This invention relates to vertically supported vessels and particularly to vessels supported in a manner to permit limited radial expansion and contraction of the vessel wall without displacement of the vertical axis of the vessel and without setting up undue stresses in the vessel wall as a result of the particular method of supporting the vessel.

In certain industrial and other processes it is required that extremely large pressure vessel be supported in a vertical position in such a manner that the axis of the vessel remains at a predetermined location within rather exacting tolerances, in the order of a few thousandths of an inch, even though the walls of the vessel expand and contract over a relatively wide range of movement as a result of large temperature and pressure changes to which the vessel is necessarily subjected. To provide such a support for a massive pressure vessel that will accomplish this purpose with the support being simple and economical to fabricate is a challenging problem that has been solved in a very satisfactory manner by the present invention.

In accordance with the present invention there is provided a vertically disposed cylindrical vessel about which is positioned a support means or frame that preferably extends above the center of gravity of the vessel. In one of the preferred embodiments of the invention this support presents an upwardly facing surface and the wall of the pressure vessel is provided with a radially extending flange that presents a downwardly facing surface that is complementary to and spaced slightly above this upwardly facing surface. Several complementary pairs of recesses are formed in these spaced surfaces with these recesses being uniformly spaced circumferentially about the axis of the vessel and radially disposed with respect to this axis. Snugly received within each pair of recesses is a pin with the several pins being effective to prevent relative rotation between the vessel and the support about the axis of the vessel while permitting relative radial movement between the vessel wall and the support with the radial disposition of the recesses and pins being effective to maintain the vertical axis of the vessel stationary during such relative radial movement. In another preferred embodiment of the invention the support frame or member includes an annular ring securely mounted upon the support frame in coaxial relation with the vessel and provided with radially directed bores uniformly spaced thereabout. The wall of the vessel is also provided with radial bores coaxial with those in the support ring and extending inwardly a short distance from the outer surface of the vessel wall. Cylindrical pins are secured within the bores of the support ring and extend into the bores provided in the vessel wall a distance less than the full depth of the bores with the inner ends of these pins being snugly but slidably received within these bores in the vessel wall thereby permitting relative radial movement between the vessel wall and the support ring without displacement of the vessel's vertical axis.

It is an object of this invention to provide a vertically disposed vessel with an improved support operative to maintain the vertical axis of the vessel at a predetermined location while permitting radial expansion and contraction of the vessel wall.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein Fig. 1 is a vertical sectional view of a vessel and support constructed in accordance with a preferred embodiment of the present invention.

Fig. 4 is a fragmentary vertical section showing a portion of the vessel support in detail.

Fig. 5 is a perspective view of upper portion of the vessel and support of Fig. 1.

Figure 2:
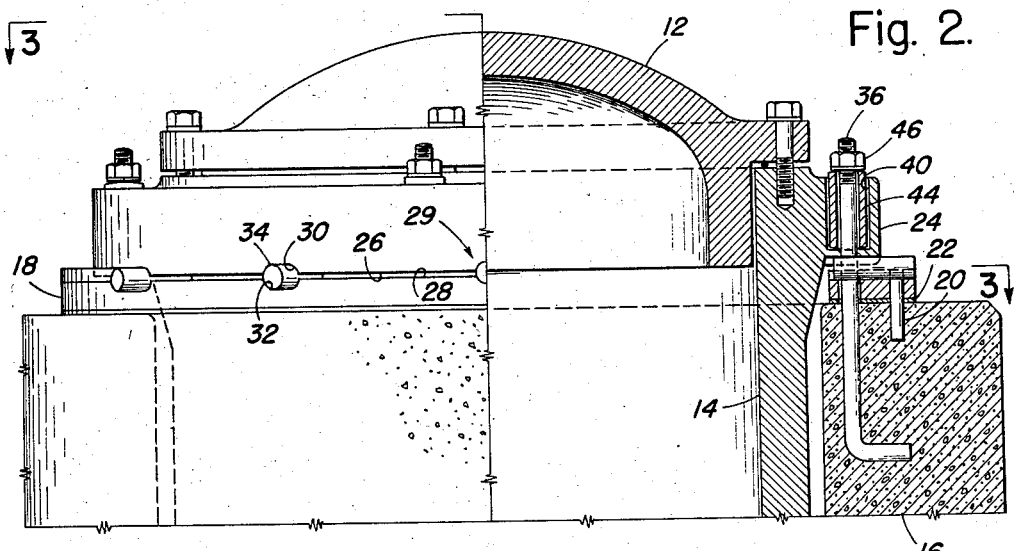
Fig. 2 is an enlarged view, particularly in section, of the upper portion of the vessel and support of Fig. 1 showing details of the construction.
Figure 3:
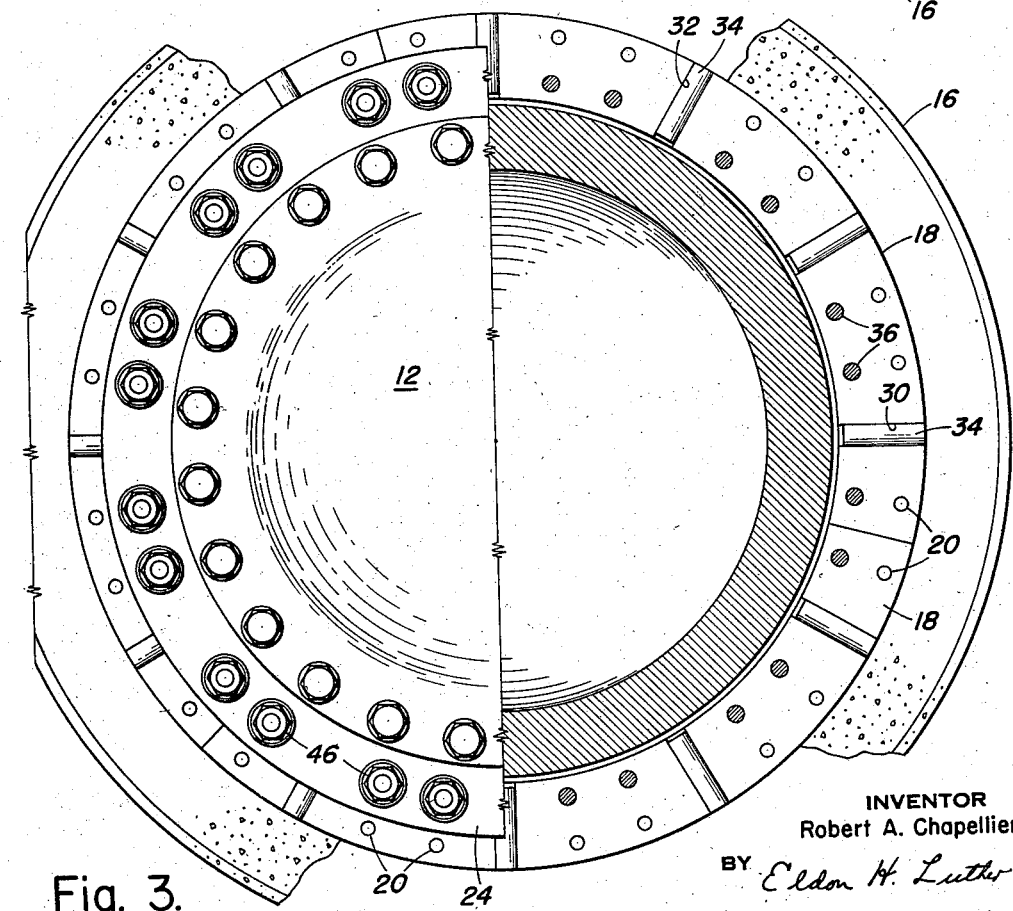
Fig. 3 is a top view partially in section and taken along line 3—3 of Fig. 2.

Referring now to the drawings, wherein like reference characters are used throughout to designate like elements, there is disclosed a pressure vessel 10 supported in a vertical position and provided at its upper end with a removable cover or closure 12. Positioned about the vessel in spaced relation with its wall 14 is the support member or frame 16 at least the upper portion of which is annular and which may take any desired form, as for example, a concrete structure or a framework of structural steel with the upper end of the support member extending well above the center of gravity of the vessel. This support member may be stationarily mounted, as upon the ground or in a building, or may be mounted upon or within a vehicle as, for example, a ship.

In the organization of Fig. 1, the metallic pin ring 18 is mounted upon the upper end of annular support 16 and is preferably made in a number of arcuate segments for ease of assembling and construction with the ring being held in place upon the end of the annular support by means of the numerous circumferentially spaced dowels 20. The ring 18 is preferably insulated from vessel 10 in order that as little heat as possible will be conducted from the vessel to annular support 16 and for this purpose a layer of thermal insulation 22 is interposed between the pin ring and the upper surface of this annular support.

At the upper end of vessel 10 there is provided a radially extending flange 24 which may be merely a thickened portion of the vessel wall as shown or may be made by means of a framework integrally secured to the vessel wall. The lower surface 26 of flange 24 is spaced slightly above and in complementary relation with the upper surface 28 of pin ring 18. These complementary surfaces are provided with pairs of generally semi-cylindrical recesses 29 with these recesses in flange 24 being designated 30 and those in pin ring 18 being designated 32 and the recesses 30 being disposed directly above the recesses 32 in each of the pairs 29. Each complementary pair of recesses 29 is radially disposed with relation to the axis of vessel 10 and the recesses are uniformly spaced circumferentially about the vessel.

Positioned within each complementary pair of recesses 29 is a cylindrical pin 34 which may be secured within either recess 30 or 32 and in slidable relation with the other recess or which may be slidable with relation to both of the recesses. The pin is snugly received within the recesses in each pair so as to prevent circumferential relative movement between flange 24 and pin ring 18 while permitting relative radial movement between these two members with this latter movement being accommodated by the aforementioned sliding relationship. Thus vessel 10 rests upon the numerous radially disposed circumferentially spaced cylindrical pins 34 and because of the radial disposition of these pins there will be no displacement of the vertical axis of the vessel as a result of radial expansion of the vessel wall 14 due to temperature changes in the metal of this wall or pressure changes within the vessel.

In the event that the annular support member 16 is mounted upon a vehicle rather than being stationarily secured to the ground or a non-movable structure it will be necessary to provide means for retaining the vessel in engagement with pins 34 and prevent upward movement of the vessel with relation to support member 16. This is accomplished in the present invention by means of the numerous circumferentially spaced studs 36 which have their lower end secured to support member 16 in any suitable manner and which extend upwardly through bores 38 and 40 provided in pin ring 18 and flange 24 respectively. Bore 40 is considerably larger than studs 36 and is provided adjacent its lower end with a radial shoulder 42 which is engaged by the lower end of sleeve 44 positioned about and in spaced relation with the upper portion of the stud with the upper end of this sleeve engaging the lower surface of nut 46 which is threaded downward upon stud 36 so that sleeve 44 is securely clamped between the lower surface of this nut and shoulder 42. The purpose of this construction is to prevent excessive bending moments being developed in studs 36 as a result of flange 24 being displaced radially with respect to support member 16 due to temperature and pressure changes as brought out hereinbefore. The upper and lower ends of sleeve 44 are rounded as shown so that as flange 24 moves radially with respect to support member 16 the studs 36 will remain in their vertical position and sleeve 44 will pivot about its rounded ends and thereby accommodate this relative radial movement without the development of excessive moments within the studs.

Figure 6:
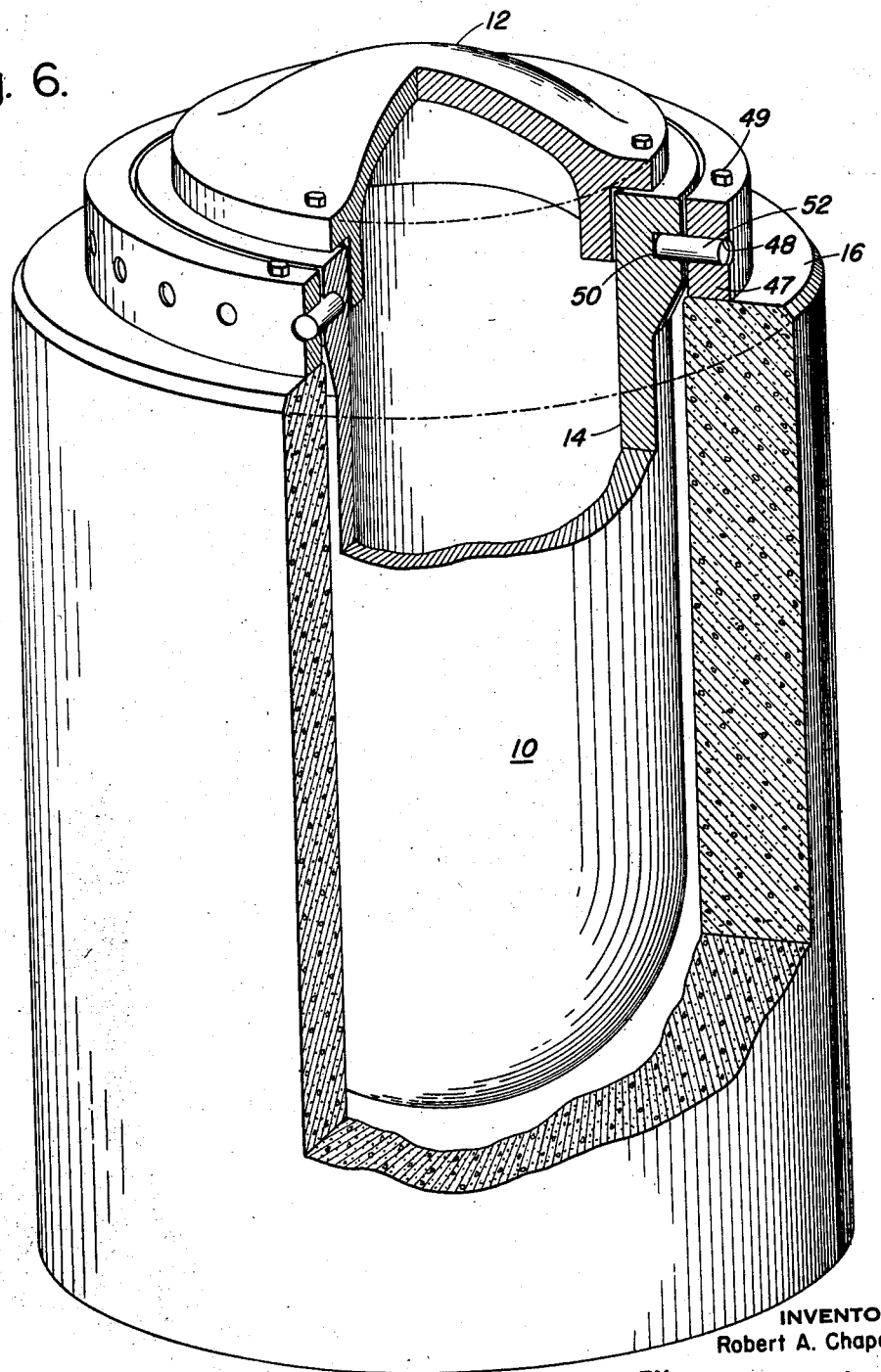
Fig. 6 is a perspective view of a modified type of vessel support.

The embodiment of Fig. 6 is similar to that of Figs. 1 through 5 except that in this embodiment annular ring 7 which corresponds to ring 18 in the embodiment of Figs. 1 through 5 is provided with numerous radial bores 48 uniformly spaced about its circumference and is secured to the upper end of support 16 by the circumferentially spaced bolts 49. The wall 14 of vessel 10 is provided with radial bores 50 coaxial with bores 48 in ring 47 and extending from the outer surface of the wall a predetermined distance thereinto but do not extend entirely through the wall of the vessel. Positioned within each of the bores 48 is a cylindrical pin 52 the inner end of which extends into the coaxial bore 50 in wall 14 being snugly but slidably received within this coaxial bore and extending thereinto a depth substantially less than the full depth of the bore in order to provide relative radial movement between the pin 52 and wall 14. Each of the pins is secured within its associated bore 48 by any suitable means, such as welding, and these pins are thus effective to support the vessel from support member 16 through annular ring 47 and, as in the case of the embodiments of Figs. 1, 2 and 3, because of the radial disposition of these pins and their uniform circumferential spacing the axis of the vessel is not displaced as a result of radial thermal expansion and contraction of the vessel.

Since, as mentioned hereinbefore, it is often necessary to accurately locate and maintain the principal axis of a vertically mounted vessel used in certain industrial processes, accurate machining is required in the manufacture of the support for these vessels and painstaking care is required in the assembling of these supports. With the support of the present invention, however, this required accuracy may be achieved in a simplified manner. In fabricating the support for the embodiments of Figs. 1, 2 and 3, the vessel is positioned within annular support member 16 and after being properly aligned, is maintained in spaced relation from the upper surface of pin ring 18 by means of temporary spacers interposed between this surface 28 and the lower surface 26 of flange 24. By means of a drill mounted in a suitable jig the pairs of complementary recesses 29 are easily and accurately made after which drilling operation pins 34 may be inserted in place. The vessel is then elevated sufficiently to remove the temporary spacers and lowered upon the pins 34.

The embodiment of Fig. 4 may be fabricated in a somewhat similar manner with vessel 10, by means of a suitable temporary support, being mounted within annular support member 16 in its accurately aligned position and with each of the coaxial radial bores 48 and 50 being made in a single operation of a radially disposed drill mounted upon a suitable jig. After all of the bores are made, pins 52 are positioned in place and are secured within bores 48 and thereafter the temporary support for the vessel may be removed with the vessel then being supported from annular support member 16 through ring 47 and pins 52.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In combination with a vertically disposed pressure vessel, a support therefor adapted to maintain the principal axis of the vessel stationary and the vessel walls free of excessive stresses notwithstanding radial movement of the vessel walls due to thermal expansion and contraction said support comprising support means surrounding said vessel and provided with at least three recesses substantially equally spaced about the axis of the vessel generally in a common horizontal plane and radially disposed with respect to the vessel's axis, each of said recesses having a pin complementary thereto received therewithin in a manner to prevent relative movement between the pin and recess circumferentially with respect to the axis of the vessel, said vessel resting upon said pins with the vessel wall having recesses complementary to the pins and receiving the pins therewithin in a manner so as to prevent relative movement between the pin and recess circumferentially with respect to the axis of the vessel, and each of said pins being received in one of said recesses in a manner permitting relative movement therebetween in a direction radially of the axis of the vessel.

2. In combination with a vertically disposed pressure vessel, a support therefor adapted to maintain the principal axis of the vessel stationary and the vessel walls free of excessive stresses notwithstanding radial movement of the vessel walls due to thermal expansion and contraction, comprising support means surrounding said vessel, said support means and said vessel wall being provided with at least three pairs of complementary recesses substantially equally spaced about the axis of the vessel with the axis of each pair of recesses lying in a common plane and disposed radial of said vessel's axis and a pin complementary with respect to each pair of recesses and received therewithin in a manner to support the vessel while permitting relative movement of the vessel wall and support means radially of the axis of the vessel but preventing relative rotative movement about the vessel's axis.

3. In combination with a vertically disposed vessel, support means including a generally upward facing surface extending about the vessel at a predetermined location, a portion of the wall of the vessel presenting a surface complementary to and in overlying spaced relation with said generally upwardly facing surface, at least three complementary grooves formed in said overlying surfaces, said grooves being spaced substantially uniformly about the axis of the vessel and the axis of said grooves lying in a plane that includes the axis of the vessel, a pin received within each set of complementary grooves in a manner to prevent relative rotative movement of said surfaces about the axis of the vessel but permit relative radial movement about said vessel's axis.

4. The combination defined in claim 3 including means for retaining the vessel in engagement with said pins comprsing a plurality of generally vertically disposed bolts means positioned about the vessel and extending through a portion of the wall thereof into the support means, the inner end of each of said bolt means being secured to said support means, a sleeve disposed about the upper portion of each of said bolt means in spaced relation thereto and securely clamped between the upper end of the bolt means and said portion of the vessel wall, with the ends of said sleeve being rounded in a manner so that said sleeve rocks about its ends in response to relative movement between said bolt means and the vessel wall in a direction radial of the axis of the vessel.

5. In combination, a vertical, cylindrical vessel, a support for said vessel including an annular member disposed about the vessel in closely spaced relation and presenting a generally upward facing annular surface coaxial with the vessel, the vessel wall including a generally radial extending annular portion presenting a surface generally complementary to said upwardly facing surface and spaced thereabove a predetermined distance, said vessel being supported from said annular member through at least three cylindrical pins disposed intermediate said spaced surfaces in recesses formed in said surfaces in complementary relation to said pins, said pins being spaced substantially uniformly about the vessel and disposed with their axes lying in planes containing the vertical axis of the vessel and in such a manner as to permit radial movement of the vessel wall with respect to said annular member while preventing relative rotative movement about the axis of the vessel.

6. The combination defined in claim 5 including means for retaining the vessel within the support in engagement with said pins comprising a plurality of generally vertically disposed stud means extending upwardly from said annular member through enlarged bores in the radially extending annular portion of the vessel wall, said stud means being spaced about the vessel, a sleeve disposed about the upper portion of each of said means in spaced relation thereto and securely clamped between a flanged member on the upper end of the stud means and said annular portion, the contact surfaces between said sleeve and the flanged member and the sleeve and the annular portion being constructed and arranged so that the sleeve rocks about its ends in response to relative radial movement between said stud means and the vessel wall.

7. In combination, a vertical, cylindrical vessel, a support for said vessel including an annular member disposed about the vessel in closely spaced relation and presenting a generally upward facing annular surface coaxial with the vessel and at an elevation above the center of gravity of the vessel, the vessel wall including a generally radial extending annular portion presenting a surface generally complementary to said upwardly facing surface and spaced thereabove a predetermined distance, said vessel being supported from said annular member through at least three cylindrical pins diposed intermediate said spaced surfaces in recesses formed in said surfaces in complementary relation to said pins, said pins being spaced substantially uniformly about the vessel and disposed radially of the vessel in a plane normal to the vessel's axis, each of said pins being slidably received in the recess in one of said members to thereby permit radial movement of the vessel wall with respect to said annular member but prevent relative rotative movement about the axis of the vessel.

8. The combination of a vertically disposed cylindrical vessel, a support for said vessel including an annular support member disposed about the vessel in coaxial relation with the vessel, said annular member having at least three radial bores extending therethrough and substantially uniformly circumferentially spaced thereabout, the vessel wall being provided with bores coaxial with the first mentioned bores and extending radially inward from the outer surface thereof a predetermined depth but less than the thickness of the wall, cylindrical pins disposed within and extending from the first mentioned bores into the bores in the vessel wall, said pins being securing in the bores in one of the members and snugly but slidably received within the bores within the other of the members whereby the vessel is effectively supported from the support means but may expand and contract in a radial direction relative thereto without displacement of the vessel's axis.

9. In an organization of the type described a support having at least three elongated recesses the axes of which are disposed in a common horizontal plane with the recesses being equally spaced from and uniformly spaced about a common vertical axis and each being of uniform cross section throughout its length, with its axis being radial of said common vertical axis, means through which a member is supported in said support and having an equal number of elongated recesses similarly spaced about said vertical axis and disposed in a common horizontal plane and with each of these latter named recesses being of uniform cross section throughout its length with its axis radially of said vertical axis, an elongated pin snugly received in each of the recesses in the said support, each of said pins also being snugly received within a recess in said means with the pin being in sliding engagement with one of the recesses.

References Cited in the file of this patent

UNITED STATES PATENTS

| 163,838 | Baker | June 1, 1875 |
| 1,154,993 | Kercher | Sept. 28, 1915 |
| 1,855,762 | Kaminski | Apr. 26, 1932 |
| 2,666,979 | Van Dusen | Jan. 26, 1954 |
| 2,773,755 | Larsen | Dec. 11, 1956 |

FOREIGN PATENTS

| 478,647 | Great Britain | Jan. 20, 1938 |